Sept. 15, 1970  D. L. DENNER ET AL  3,528,574
VEHICLE CARGO ELEVATOR AND STORING ARRANGEMENT THEREFOR
Filed Jan. 31, 1969  3 Sheets-Sheet 1

INVENTORS
DAVID L. DENNER
DONALD E. STOLL

ATTORNEYS

INVENTORS
DAVID L. DENNER
DONALD E. STOLL

ATTORNEYS

Sept. 15, 1970  D. L. DENNER ET AL  3,528,574
VEHICLE CARGO ELEVATOR AND STORING ARRANGEMENT THEREFOR
Filed Jan. 31, 1969  3 Sheets-Sheet 3
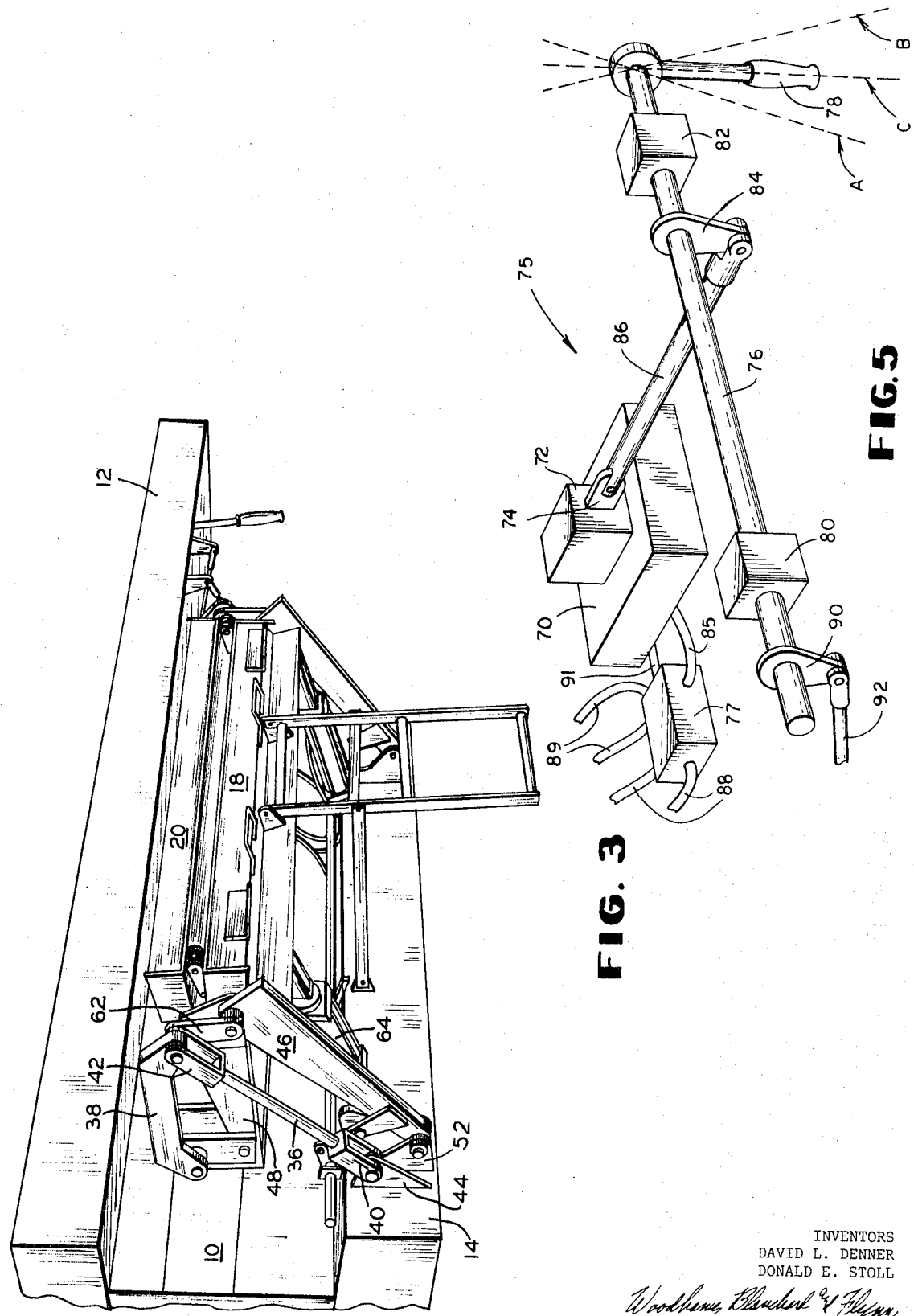
INVENTORS
DAVID L. DENNER
DONALD E. STOLL
ATTORNEYS United States Patent Office 3,528,574
Patented Sept. 15, 1970

3,528,574
VEHICLE CARGO ELEVATOR AND STORING ARRANGEMENT THEREFOR
David L. Denner, Toledo, and Donald E. Stoll, Richfield Township, Lucas County, Ohio, assignors to Overhead Door Corporation, Toledo, Ohio, a corporation of Indiana
Continuation-in-part of application Ser. No. 759,909, Sept. 16, 1968. This application Jan. 31, 1969, Ser. No. 795,418
Int. Cl. B60p *1/48*
U.S. Cl. 214—77
6 Claims

ABSTRACT OF THE DISCLOSURE

A lift device having a platform adapted to be mounted to a vehicle, such as a truck, by two sets of parallel linkages which are operated by power cylinders and which can be folded to move the platform into a storage position beneath the vehicle cargo bed. Control means automatically stops the downward movement of the folded device at a predetermined distance from its storage position so that it can be unfolded at a convenient height without interference by the ground or by the vehicle.

CROSS REFERENCE TO RELATED APPLICATIONS

This application is a continuation-in-part of our copending application Ser. No. 759,909, filed Sept. 16, 1968, and entitled Vehicle Cargo Elevator and Storing Arrangement Therefor.

FIELD OF THE INVENTION

This invention relates to a cargo elevator or lift device adapted to move cargo between the ground and the bed of a vehicle while maintaining the cargo support platform in a horizontal position.

BACKGROUND OF THE INVENTION

Many prior art devices exist for lifting and loading cargo from the ground to a vehicle cargo bed, or for reversing this procedure. Many of these prior devices have provided a linkage system which permits the lifting platform to be pivoted vertically to close the end of the vehicle or to fold the platform upon the parallel arms of the linkage system for storage beneath the cargo bed. The latter type, which are many and varied, often include two sets of parallel linkage arms having a pivot in the tension arm or in the compression arm or in both to permit the platform to be folded upon or beneath the parallel arm linkage system. Likewise, the pivoted connections between the parallel arm linkage systems and the platform have been such to permit the platform to pivot with respect to the parallel arm linkage systems, or either the tension arms or the compression arms have been permitted to telescope (or provided with lost motion), to accommodate pivoting of the platform to a stored position.

SUMMARY OF THE INVENTION

This invention relates to a cargo elevator or lift device mounted on a vehicle and, more particularly, to a device having parallel linkages connecting the cargo platform to the vehicle and permitting the same to be elevated and lowered while in a position parallel to the ground. Such parallel linkages are constructed to allow both the tension and the compression arms to be pivoted between the ends thereof whereby the outer portions can be folded upon the inner portions and the cargo platform can be folded upon itself and upon the linkages to permit storage of the platform and the parallel linkages beneath the cargo bed without obtrusive projection.

Furthermore, the present invention provides control means coacting with the folded device to stop the downward movement thereof from the storage position, at an intermediate position above the ground where the device can be unfolded at a convenient height without interfering with the ground.

BRIEF DESCRIPTION OF THE DRAWINGS

FIG. 3 is a perspective view illustrating both the tension and compression arms folded upon themselves (as well as the platform being folded upon itself) and raised to its stored, traveling position beneath the vehicle bed.

FIG. 5 is an enlarged perspective view of the hydraulic control system for the device.

DETAILED DESCRIPTION

Figure 1:
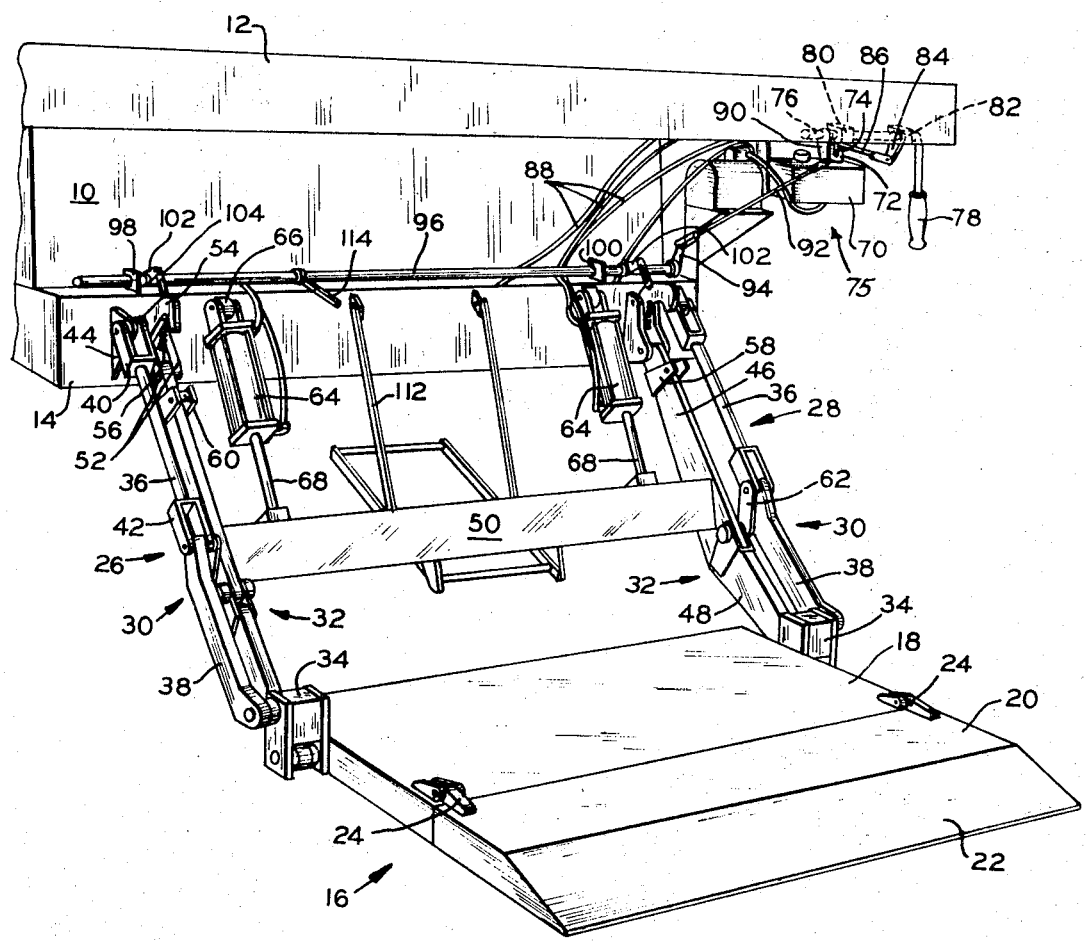
FIG. 1 is a perspective view of the cargo elevator in its lowered ground engaging position, particularly disclosing the parallel arm linkages.

Referring now to the drawings and in particular to FIG. 1, the side (or alternatively the rear) portion of the frame of a motor vehicle is illustrated generally at 10. The vehicle frame 10 and a cargo bed 12 seated on the frame vary from vehicle to vehicle and the details of these form no part of this invention. Means is provided for mounting the cargo elevator to the frame 10 of the vehicle. More particularly, the mounting means takes the form of an elongated box shaped member 14 suitably secured to the frame 10, such as by welding.

Figure 2:
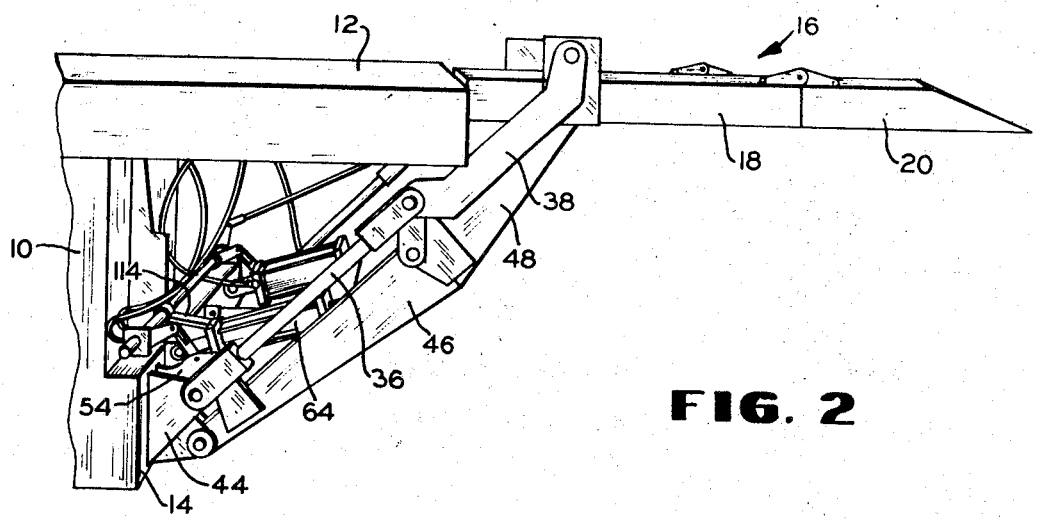
FIG. 2 is a perspective view from the side of the cargo elevator showing the elevator in a horizonal position adjacent the vehicle bed.

A cargo platform 16 is provided for receiving cargo in its ground engaging lowered position as shown in FIG. 1 and for lifting the cargo to the position shown in FIG. 2 wherein it may be moved onto the vehicle cargo bed 12. The cargo platform 16 consists of a rear section 18 and a front section 20 provided with a beveled forward portion 22 to more easily accommodate wheeled carts which may be pushed up the beveled incline onto the platform. The rear section 18 and the front section 20 are pivotally secured together by a pair of hinges 24 positioned adjacent the sides of the platform whereby the front section 20 may be pivoted so that it lies upon the rear section 18 when desired for storage purposes.

A pair of parallel arm linkages 26 and 28 are pivotally secured at their outer ends to the platform 16 and have their inner ends pivotally attached to the mounting means 14 and thus serve as the means for lifting and lowering the platform. The parallel linkages 26 and 28 are identical in construction and each comprises a tension arm 30 and a compression arm 32. The tension arms 30 and the compression arms 32 are spaced laterally beside the platform 16 and are pivotally mounted with respect thereto by a box-like securing structure 34 which is welded to the sides of the platform.

Each tension arm 30 is comprised of an inner section 36 and an outer section 38 pivotally secured together. The inner section 36 has clevices 40 and 42 secured to the opposite ends thereof. The clevis 40 is pivotally connected to an anchor member 44 attached to the mounting means 14, whereas the clevis 42 is pivotally connected to an end of the outer section 38. The other end of the outer section 38 is pivotally connected to the box-like securing structure 34 to pivotally secure the tension arms to the platform 16.

Each compression arm 32 likewise consists of an inner section 46 and an outer section 48. One end of outer section 48 is pivotally connected to the lower portion of the securing structure 34 while the other end of outer section 48 terminates in a U-shaped portion having considerable depth. The adjacent end of inner section 46 is positioned between and pivotally connected to the arms of the U-shaped portion of the outer section 48. Accordingly, the inner and outer sections 46 and 48 may pivot in one direction with respect to each other but their lower portions abut against each other to prohibit relative pivotal movement in the opposite direction.

A cross member 50 extends between the compression arms 32 and is welded to the inner sections 46 to reinforce the compression arms and provide a rigid structure. The other ends of the inner sections 46 are positioned between and pivotally connected to a pair of spaced anchor members 52 secured to the mounting means 14.

A hook-like latch member 54 is pivotally mounted to each anchor member 52 and is biased in a clockwise direction as viewed in FIG. 1 by a coil spring 56 attached between the latch member and the anchor member. To cooperate with the hook-like latch member 54 when the cargo elevator or platform 16 is in its raised position, a pair of ears 58 extend upwardly from and are secured to the inner section 46 of the compression arms and mount a latch pin 60 thereon.

To insure that a parallel relationship is maintained between the tension arms 30 and the compression arms 32, there is provided a link member 62 which has one end thereof pivotally secured to the pivot connection between the inner and outer sections of the tension arm and the other end thereof pivotally secured to the pivot connection between the inner and outer sections of the compression arm.

To provide means for moving the cargo elevator from the grounded lowered position shown in FIG. 1 to the raised position shown in FIG. 2, as well as the storage position shown in FIG. 3, a pair of fluid power cylinders 64 are provided. The inner ends of the power cylinders 64 are provided with ears which are pivotally connected to an anchor 66 extending from the mounting means 14. A piston rod 68 extends from the other end of the power cylinder 64 and has one end attached to a piston (not shown) which reciprocates within the power cylinder, the other end of the piston rod being pivotally secured to the cross member 50.

Control means 75 (FIGS. 1 and 5) is also provided for controlling the flow of fluid to and from the power cylinders 64. More particularly, fluid under pressure is supplied to the power cylinders 64 from a conventional fluid pump 70 which is actuated by an electric switch 72. Switch 72 is opened and closed by means of a switch actuator 74. A manual control rod 76 having a handle 78 thereon is mounted on vehicle frame 10 by means of guide brackets 80 to 82. Control rod 76 carries intermediate its ends a lever 84 which is connected to switch actuator 74 by means of a link 86 whereby rotation of the handle 78 to rotate control rod 76 about its axis actuates hydraulic motor switch 72. Switch 72 is a conventional hydraulic motor switch and, in addition to controlling the pump 70, also controls the position of a conventional hydraulic valve means 77, which in turn controls the flow of fluid to and from the power cylinders 64.

When the switch 72 is in a first control position as determined by the rotational position of the handle 78, the valve means 77 will likewise be positioned in a first control position whereby pressurized fluid from the pump 70 will flow through conduit 85 to the valve means 77, with the pressurized fluid then being supplied through the conduits 89 to the upper ends of the power cylinders 64 for causing an extension or outward movement of the piston rods 68. When the switch 72 and the valve means 77 is in this first control position, the conduits 88 connected to the lower ends of the power cylinders 64 will be vented back through the valve means 77 so as to discharge the fluid from the lower ends of the cylinders 64 through the conduit 91 into the reservoir which is contained within the hydraulic pump means 70.

When the switch 72 and the valve means 77 is moved to a second control position, as determined by a new rotational position of the handle 78, pressurized fluid will then be supplied to the lower ends of the power cylinders 64 by means of the conduits 88, whereupon the fluid in the upper ends of the cylinders will be vented back through the conduits 89 and 91 into the reservoir.

When the handle 78 is moved to a third rotational control position, the switch 72 and valve means 77 will likewise be moved to a third control position in which all ports within the valve means 77 will be closed so as to prevent flow to or from the power cylinders 64. The three control positions described above have been diagrammatically illustrated in FIG. 5 as positions A, B and C, respectively.

On the remote end of the control rod 76 is a lever 90 which is adapted to rotate when the control rod 76 is pivoted about its axis. A link 92 is pivotally connected to the lever 90 at one end and to a lever 94 which is mounted for rotation with a second control rod 96 positioned above the mounting means 14 and pivotally secured with respect thereto by brackets 98 and 100. A pair of levers 102 are spaced adjacent the ends of the second control rod 96 and extend upwardly therefrom. A link 104 is pivotally connected to each lever 102 and also to the hook-like latch member 54. Accordingly, when the second control rod 96 is rotated, the levers 102 also rotate therewith and pivot the hook-like latch members 54 (counterclockwise in FIG. 1) to release the latch pin 60 provided on the compression arms 32.

While the power cylinder control means 75 as shown as positioned adjacent one side of the parallel linkages, such control means can alternatively be positioned on the other side of the parallel linkages or, if desired, duplicate control rods may be provided.

OPERATION

In operation, the vehicle is driven with the cargo elevator or lift platform 16 in its stored position as shown in FIG. 3. When the vehicle has reached the desired destination, the cargo elevator is lowered by the operator manually rotating control handle 78, which is originally in position C, in a clockwise direction (FIG. 5) to position A. This rotation of the control rod 76 does two things. First, it pivots lever 90 to move link 92 and lever 94 to cause rotation of the second control rod 96. This rotation of the second control rod 96 through levers 102 and links 104 causes pivotal movement of the hook-like latch members 54 to release the latch pins 60.

Figure 4:
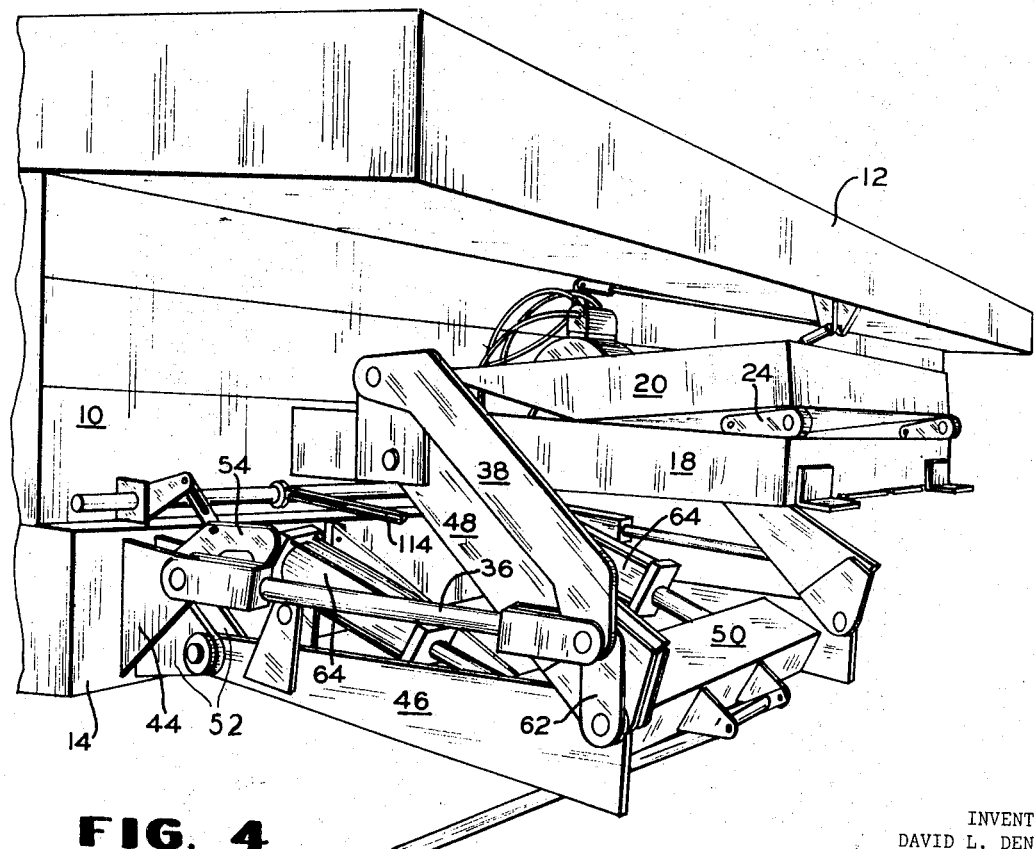
FIG. 4 is a perspective view of the platform and linkage in its folded position similar to FIG. 3 but with the device partially lowered.

Second, rotation of the control rod 76 pivots lever 84 and through link 86 and switch actuator 74 actuates the electric switch 72 to cause the fluid pump 70 to evacuate fluid from the outer ends of the cylinders 64. Thus, the piston rods 68 start to move out from the power cylinders 64 permitting the cargo elevator and the linkage mechanism to move to the position shown in FIG. 4. Further downward pivotal movement of the cargo elevator causes the rear section 18 of the platform 16 to engage an elongated control lever 114 fixedly secured to and extending outwardly from the second control rod 96. This engagement causes rotation of the second control rod 96 and through lever 94, link 92 and lever 90 rotates the first control rod 76 counterclockwise to return the control handle to original position C, thereby stopping the flow of fluid to fluid motor 70. At this partially lowered position, the operator then manually pivots the outer sections 38 and 48 of the tension and compression arms respectively with respect to their inner sections. The control lever 114 is appropriately positioned on the second control rod so that when it is engaged to stop the lowering of the cargo elevator, the outer portion of the elevator may be pivoted without engaging the under surface of the cargo bed 12.

After the tension and compression arms 30 and 32 have been pivoted to their unfolded position, the front section 20 of the platform 16 may be pivoted with respect to the rear section 18 to place the platform also in its unfolded position. The operator then again pivots the control handle 78 in a clockwise direction to position A to effect continued downward movement of the platform until it reaches the ground engaging position shown in FIG. 1.

A wheeled cart or similar type cargo is then rolled up the beveled forward portion of the platform onto the platform. The operator then pivots control handle 78 in the counterclockwise direction (FIG. 5) to position B to actuate electric switch 72 causing the fluid motor 70 to supply fluid to the outer ends of the power cylinders 64. This causes piston rods 68 to telescope within the power cylinders and thus pivot the parallel linkages 26 and 28 with respect to their connection with the mounting means 14 until the cargo elevator is in the position shown in FIG. 2. From this position, the cargo may then be moved onto the vehicle bed.

To return the cargo elevator to its stored, carrying position, the control handle 78 is again pivoted in the clockwise direction to position A causing lowering of the platform. The operator then pivots control handle 78 back to position C to stop the platform in a partially lowered position. Then, the front section 20 of the platform 16 is manually folded upon the rear section 18. Next, the outer section 38 and 48 of the tension and compression arms are folded about their pivots with the inner sections so that the outer sections are folded upon the inner sections. The links 62 connecting the pivots between the inner and outer sections of the tension and compression arms insure that the linkages are maintained in their proper relationship. Then, the control handle 78 is again pivoted in the counterclockwise direction to position B to raise the platform and parallel linkages 26 and 28 from their partially lowered position shown in FIG. 4 to the stored, carriage position shown in FIG. 3. During this upward pivotal movement, the latch pins 60 come into engagement with hook-like latch members 54 which then firmly, securely hold the platform in its raised stored position even in the event of a fluid power failure.

From the foregoing it is apparent that a vehicle cargo elevator has been provided which will not only quickly and conveniently lift cargo from the ground to the vehicle bed but will also permit folding of the platform and its linkage system into a compact storing package.

The embodiments of the invention in which we claim an exclusive property or privilege are defined as follows:

1. In a lift device having a cargo-support platform and linkage means adapted to be mounted upon a vehicle for raising and lowering said platform, said vehicle having a cargo bed and said platform being adapted to be folded upon said linkage means and held in a raised storage position beneath said bed, the combination comprising:

means pivotally connecting said linkage means to said vehicle;

drive means connected between the linkage means and the vehicle for effecting pivotal movement thereof whereby said platform is raised and lowered;

first control means operably connected to said drive means and manually actuable to energize and de-energize said drive means; and second control means operably connected to said first control means and engaged by said platform when it is folded upon said linkage means and is moved downwardly a preselected distance from said storage position whereby said downward movement is stopped, thereby permitting the platform to be unfolded from upon said linkage means.

2. A cargo-lift device according to claim 1, wherein said linkage means includes a pair of spaced tension arms pivotally interconnected between the vehicle and the platform, and a pair of spaced compression arms pivotally connected between the vehicle and the platform.

3. A cargo-lift device according to claim 2, wherein said second control means includes a lever pivotally mounted on said vehicle and second linkage means interconnecting said lever to said first control means, said first control means being operated to stop said drive means when said lever is moved to a predetermined position by said platform.

4. A cargo-lift device according to claim 3, wherein said tension arms and compression arms are pivoted between the ends thereof whereby each arm can be folded upon itself to permit the platform to be moved between an operative position wherein the compression and tension arms are substantially straight and the storage position wherein the tension and compression arms are substantially folded upon themselves.

5. A cargo-lift device according to claim 4, wherein the free end of the lever is adapted to be contacted by the platform when said arms are folded and moved downwardly from the storage position, said drive means further including switch means selectively positionable either in an operative position permitting movement of said platform, or in a lock position for maintaining said platform stationary, said second control means including means interconnected between said control lever and said switch means whereby angular displacement of said control lever by said platform causes said switch means to move from the operative position to the lock position for stopping said platform and holding same in an intermediate position spaced below said storage position, wherein said first-named linkage means and said platform can be manually unfolded into the operative position.

6. A vehicle cargo elevator, comprising:
    a cargo platform adapted to lift cargo between the ground and a cargo bed;
    vehicle mounting means;
    linkage means pivotally connected at one end to said cargo platform and pivotally connected at the other end to said vehicle mounting means;
    drive means connected to the linkage means for effecting lifting and lowering movement of said platform between a first ground engaging position and a second elevated position;
    said linkage means also including means for permitting said platform to be moved between an operative and an inoperative position, said platform when in the operative position being positionable adjacent the edge of the cargo bed when moved to the second position, said platform when in the inoperative position being positionable substantially underneath the edge of the cargo bed for storing same when moved to the second position; and
    control means for automatically stopping said platform at an intermediate position when said platform is in its inoperative position and is being moved downwardly from said second position toward said first position, thereby permitting the platform to be moved from the inoperative to the operative position.

References Cited
UNITED STATES PATENTS 3,172,549   3/1965   Novotney.
3,251,488   5/1966   Robinson et al.
3,369,678   2/1968   Robinson.

GERALD M. FORLENZA, Primary Examiner

R. J. SPAR, Assistant Examiner